United States Patent

[11] 3,567,956

[72] Inventor Fred A. McNiel
       611 Bouldin Ave., Austin, Tex. 78704
[21] Appl. No. 824,081
[22] Filed May 13, 1969
[45] Patented Mar. 2, 1971

[54] AUTOMATIC DECELERATION WARNING SWITCH
    9 Claims, 2 Drawing Figs.
[52] U.S. Cl.................................................. 307/121,
                                              307/132, 340/72
[51] Int. Cl.................................................. H01h 35/00
[50] Field of Search....................................... 340/72, 8,
                                    (Inquired); 307/132, 121

[56] References Cited
         UNITED STATES PATENTS
1,885,714  11/1932  Hampton....................... 340/72
3,359,540  12/1967  Dunavan....................... 340/72
3,375,496   3/1968  Antunovic..................... 340/72

Primary Examiner—Robert K. Schaefer
Assistant Examiner—H. J. Hohauser
Attorney—Jones and Lockwood ABSTRACT: The subject invention relates to a switching device which will be activated by the sudden release of an automotive accelerator pedal. A pendulum arm is secured to the accelerator linkage and will operate when the position of the linkage is suddenly changed, but will not operate when the position is changed at a normal speed. A switch unit enclosed in a casing has a clevice type switch arm which extends through the casing to engage the pendulum arm when the accelerator pedal is released suddenly thereby to close two pairs of contacts. Three circuits are completed by the closing of the contacts through which current from a power source causes the vehicle's stop lamp to illuminate, a signal lamp within the visual range of the vehicle driver to illuminate, and a flasher unit to energize. The flasher unit, after a predetermined period of time, conveys current to an electromagnet secured within the casing which causes the switch unit to reset, whereby the contacts are disengaged and the circuits are broken.

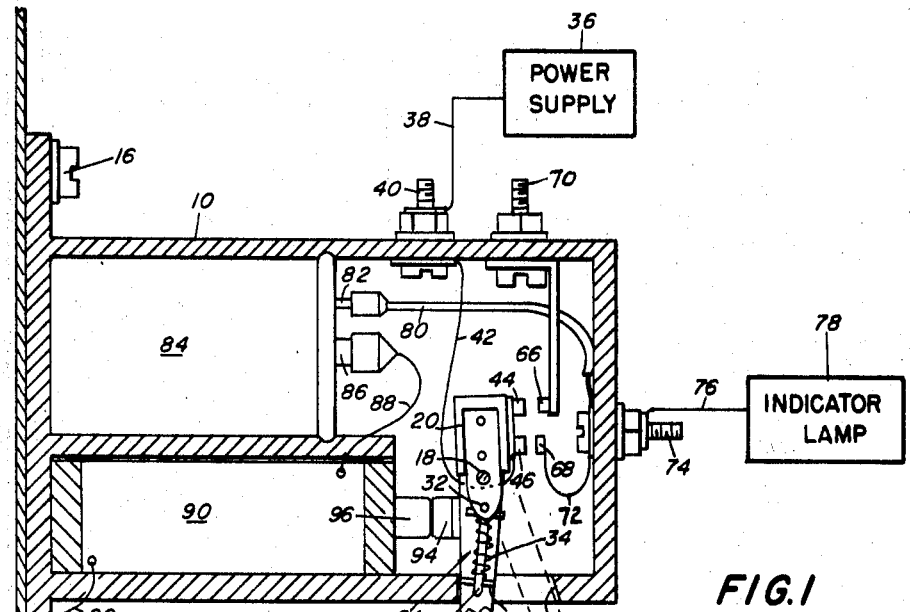
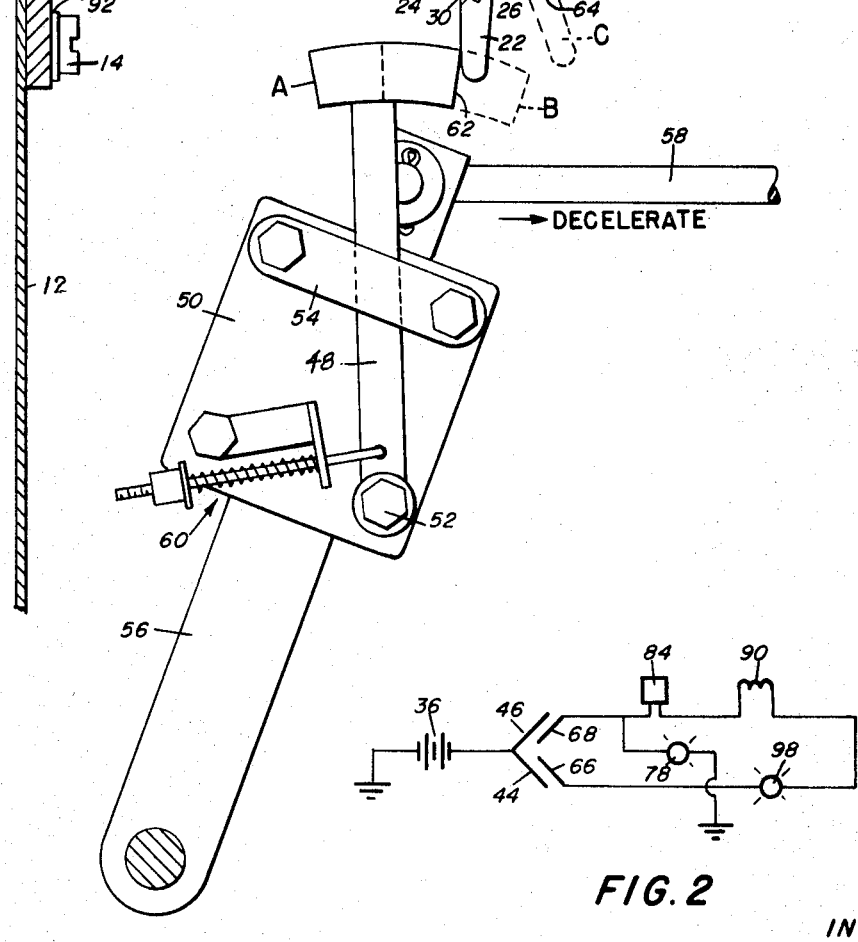
FIG.1
FIG.2
INVENTOR
FRED A. McNIEL
BY Blakland Jones
ATTORNEYS 3,567,956

AUTOMATIC DECELERATION WARNING SWITCH

BACKGROUND OF THE INVENTION

This invention relates to a device for automatically illuminating the stop-warning lamps on an automobile upon a quick and sudden release of an accelerator pedal.

One of the most frequent automobile accidents today is the rear end collision, and although many devices have been made in an attempt to reduce such collisions, none have been very effective. In general, the object of such devices is to give a following driver advance warning of a reduction in speed, before the leading driver applies his brakes. Presently known devices generally provide this result by means of inertia switches which operate as the car decelerates. Although such devices are useful in some circumstances, they are not effective in reducing the reaction time of the driver of a following vehicle because he will not get any initial warning of an impending stop until after the car actually begins to slow down. Since this deceleration is time consuming, valuable reaction time for the following driver is lost while the forward car decelerates from a high velocity with sufficient force to operate a conventional inertia switch. In most prior devices of this type, after the stop lamp has been illuminated by a sudden deceleration, there is no means by which the switch can be deactivated except by a complete deceleration or by accelerating the vehicle; therefore, the stop lamps will remain illuminated by the inertia switch. Since the driver of the car would normally be applying the automobile's brakes after a short period of time to illuminate the stop lamps by the conventional means, the inertia switch has no effective use after initial deceleration but it cannot be extinguished.

Many of the present day automatic warning deceleration switches are very complex and require a major modification of the vehicle for installation. This presents a major economic problem because the vast majority of the cars used on the highway today do not have inertia switches; therefore, to provide each motor vehicle with this new safety feature would produce a prohibitive economic burden on the individual car user. If the safety feature was applied only new cars, many years would pass before all vehicles would be equipped with this important safety feature.

SUMMARY OF THE INVENTION

It is, therefore, an object of this invention to provide a device which will automatically illuminate a vehicle's stop lights sooner than the conventional brake-operated stop light switches and the present deceleration switches so that only a fraction of a second will be lost in reaction time in case of emergencies or other sudden stops.

Another object of this invention is to provide a deceleration warning switch which will not tend to keep a stop light illuminated after the vehicle is brought to a halt.

Another object of this invention is to provide a warning device which will remain completely dormant through all normal acceleration and deceleration stages and will not produce false or needless warnings, but which will provide immediate warning of sudden deceleration to a following vehicle.

Another object of this invention is to provide a deceleration warning device which operates on the conventional stop light of a vehicle but will not interfere in any way with the normal operation of the vehicle acceleration system or its conventional stop light system, the device also providing a motor vehicle operator with the capability of giving advanced warning of a premeditated stop.

An additional object of this invention is to provide a simple mechanical warning device which will operate almost indefinitely without malfunction and which can be adapted to any make or model of gasoline powered automobile or truck.

These and other objects are accomplished by the present invention through the use of a spring loaded snap action switch unit composed of two opposing clevice type hinge arms, mounted on a fixed shaft in such a manner that each arm is confined to a limited arc of movement. The first arm carries dual contact points which will pivot and engage individually insulated contact points positioned within the casing as the second hinged arm pivots in its arc of movement. A power source is connected to the contact points on the hinge arm, and upon contact two, circuits are completed. The first circuit is tied into the vehicle stop light circuit thereby causing the stop light to illuminate. The second circuit conveys current into a time delay means such as a flasher unit which will delay the current for a predetermined period of time. At the end of the delay, an electromagnet is energized, the current in the electromagnet causing a magnetic field to attract a soft metal lug secured to the second arm, thereby pivoting the second arm back to its original position. This will cause the first arm to pivot in such a manner as to disengage the contact points and the two circuits will be cut.

A pendulum type shaft is pivotally mounted on a support means which, in turn, is mounted on a rotatable portion of a vehicle accelerator linkage. A spring secured to the support and to the pendulum shaft biases the pendulum with sufficient force that it will not move in its arc of movement during normal movement of the accelerator linkage. The pendulum shaft will be forced to rotate in a predetermined arc when the accelerator linkage moves with sufficient speed such as would be caused by a sudden release of the accelerator pedal so that the inertial force of a weight of the pendulum will overcome the bias of the spring. The pendulum will engage the second arm of the switch unit, thereby causing the switch unit to operate to illuminate the stop lamps and energize the reset circuitry which will cause the switch to deactivate itself.

BRIEF DESCRIPTION OF THE DRAWINGS

The foregoing and additional objects, features and advantages of the invention will be apparent to those skilled in the art from the following detailed description of a preferred embodiment taken with the accompanying drawings, in which:

FIG. 1 is a side view of the invention as mounted on an existing fire wall and accelerator linkage of a motor vehicle; and FIG. 2 is a circuit diagram of the signal system.

DESCRIPTION OF A PREFERRED EMBODIMENT

Referring more particularly to the drawings, in FIG. 1, the numeral 10 illustrates a body or casing secured to a vehicle fire wall 12 by screws 14 and 16. A fixed hinge shaft 18 which may be supported by the sidewalls of the casing carries opposing, hinged, clevice type arms 20 and 22 which are mounted in such a manner that each moves through a prescribed arc of rotation. Second arm 22 carries a first bias spring unit 24 which includes a fixed spring shackle 26 which has a hole 28 for the lower end of a plunger rod 30. The opposite end of the plunger rod 30 is affixed to the lower extremity of first arm 20 by a pin 32. A compression spring 34 encases the plunger rod 30 and is under sufficient compression to bias the axes of hinge arms 20 and 22 in a flip-flop snap action manner, as the center of movement of the spring pressure in relation to the hinge arms is shifted by the movement of second arm 22 from one extreme of its arc of travel to the opposite extreme.

A power supply 36 is connected by means of a power wire 38 to an insulated power terminal 40. A flexible first ribbon conductor 42 will convey the current from the power terminal 40 to first and second contacts 44 and 46, respectively, which are carried on first arm 20.

A pendulum rod 48 s pivotally mounted on bracket 50 by fastener 52. The motion of the pendulum rod is restricted by means of a guide bar 54 which is carried on bracket 50 and forms a slot in which the rod may swing. Bracket 50 is secured to an existing rocker arm 56 which is carried by a throttle arm 58 of a conventional accelerator linkage. A bias spring assembly 60 holds the pendulum rod 48 in an upright position at the back extremity of its arc of swing. The pendulum rod will remain in this position, shown as Position A, as the accelerator linkage is returned to a closed throttle position during normal operation of the vehicle. However, when the accelerator pedal (not shown) is released hurriedly in the case of an emergency or necessity of a sudden stop, inertial force caused by the sudden movement of the accelerator linkage urges weight 62 on the free end of the pendulum rod 48 to overcome the resistance of bias spring assembly 60 and move from Position A, shown by the solid outline in FIG. 1, to Position B indicated by dotted lines. The motion of weight 62 past Position A will carry the second arm 22 to a point whereby the center of moment of force applied to compression spring 34 snaps second arm 22 to the location against stop 64 as indicated by dotted outline shown as Position C.

The force of movement of second arm 22 will overcome the bias of spring assembly 24 and cause first arm 20 to be snapped forward as shown to the right of FIG. 1. The first and second contacts 44 and 46 will be snapped into engagement with third and fourth contacts 66 and 68, respectively which are carried within the casing 10. Third contact 66 is attached to an illumination terminal 70 which is tied into the conventional stop light circuits (not shown). Fourth contact 68 is mounted on a second ribbon conductor 72 which is flexible in order to assure firm contact between all the contacts. The second ribbon conductor 72 is attached to a signal terminal 74 which is connected by first lead wire 76 to an indicator lamp 78 in the visual range of the vehicle operator to keep him informed that the device is functioning. A second lead wire 80 within the casing connects the terminal 74 to an input terminal 82 of a flasher unit 84. The flasher unit is of a conventional type which is used in the direction signals of the present day motor vehicles. A conventional flashing unit generally has a bimetallic element which, when heated, will move to close a pair of contacts to complete an electrical circuit through the flasher. The time required for the element to heat and close the contacts provides the desired time delay. An output terminal 86 passes current from the flasher unit through an output lead 88 to the input of the coil of an iron core electromagnet 90. The other end of the coil winding for electromagnet 90 is connected to a ground lead 92 which is attached to a suitable ground for the electrical system.

A soft iron lug 94 is secured to the second arm 22 and rests against the face of the core 96 of electromagnet 90 when the switch unit is in the open position illustrated in FIG. 1.

When the device is operated by the sudden release of the accelerator pedal, the second arm 22 is moved forward and thereby causes first contact 44 and second contact 46 secured to first arm 20 to engage third contact 66 and fourth contact 68, respectively. This will close a first circuit to illuminate the vehicle stop lights, a second circuit to the flasher and electromagnet, and a third circuit to illuminate the signal indicator 78. When the electromagnet becomes energized after the time delay imposed by the flasher, current flows through the coil of electromagnet 90, creating a magnetic field which will attract lug 94. This magnetic field draws the second arm 22 back against the face of the electromagnet core 96. The rotation of the second arm 22 will snap the first arm 20 back to its original position, thereby resetting the switch unit by breaking the circuits to extinguish the stop lamps and the indicator lamp, to deenergize the flasher, and to place the device in proper posture for subsequent operation in case of emergency. Thus, the switch is immediately activated by a prescribed motion of the pendulum, remains energized for a predetermined period of time, and resets itself.

Referring to FIG. 2, various circuit elements described above are illustrated in schematic form. The battery 36 is shown as being connected through contacts 44, 66 to one branch of the circuit, which includes a stop lamp 98. When second contact 46 engages fourth contact 68, indicator lamp 78 is illuminated and flasher unit 84 is energized by battery 36. After the predetermined time delay, the flasher unit 84 conducts current into electromagnet 90, and, as has been described, when the electromagnet is energized, it attracts the lug 94 on second arm 20 thereby causing all circuits to be broken and causing deactivation of the warning device.

It can be seen from the above description and drawings that the automatic switching device provides a means to illuminate vehicle stop lights at the instant the operator of the vehicle quickly releases the accelerator pedal in the case of an emergency or necessity for a sudden stop. There is also no tendency to keep the stop lamps illuminated after the brakes are released or the vehicle is brought to a halt, and the warning device will not operate during normal or ordinary deceleration of the motor vehicle. No interference with normal operation of the vehicle accelerator linkage or the conventional stop light system will be encountered, and the vehicle operator may also voluntarily use the device to provide an advance warning for a predetermined stop. This simple and effective unit may be adapted to any make or model of the present day automobile or truck. The device also provides the precious additional reaction time the operator of a following vehicle needs to avoid a rear end collision.

The described embodiment can be modified in numerous ways and this will be apparent from the foregoing. For example, a suitable switch arm change may be made, any device which will delay current can be substituted for the flasher unit, and a solenoid can be used to pull the switch arm back rather than the electromagnet illustrated. These and other variations and changes can be made in the invention as above-described and illustrated without departing from the true spirit and scope thereof as defined in the following claims.

I claim:
1. A switch comprising:
   a. a casing;
   b. a load circuit for energizing a remote device;
   c. first contact means in said casing for opening and closing said load circuit;
   d. actuating means for manipulating said first contact means so that said load circuit will be opened and closed, selectively;
   e. a time delay reset circuit for resetting said actuating means; and
   f. a second contact means carried on said actuating means for opening and closing said time delay reset circuit.

2. The switch of claim 1, wherein said time delay reset circuit includes:
   a. delay means for delaying current for a predetermined time;
   b. a first conductor connecting said delay means and said contact means;
   c. electromagnetic means for resetting said actuating means; and
   d. a second conductor for connecting said delay means and said electromagnet means.

3. An apparatus for use in a vehicle in combination with an existing accelerator linkage to provide early warning of deceleration prior to an emergency stop comprising:
   a. a casing;
   b. a load circuit for energizing a remote device;
   c. first contact means in said casing for opening and closing said load circuit;
   d. actuating means for manipulating said first contact means so that said load circuit will open and close, selectively;
   e. a time delay circuit for resetting said actuating means;
   f. second contact means carried on said actuating means for opening and closing said time delay reset circuit; and
   g. pendulum means secured to the existing accelerator linkage for engaging said actuating means when said accelerator linkage is released suddenly.

4. The apparatus of claim 3, wherein said actuating means includes opposed, hinged first and second clevis arms which will operate with a "snap action" between a first and second position.

5. The apparatus of claim 4, wherein said first contact means includes a first contact carried on said first arm and a rigidly, fixed second contact carried within said casing for engaging said first contact to close said load circuit when said actuating means is in the second position, and wherein said second contact means includes a third contact carried on said first arm and a fourth contact for engaging said third contact to close said time delay reset circuit when said actuating means is in the second position, said fourth contact being movably mounted within said casing in order to provide a more positive engagement between said contacts.

6. The apparatus of claim 3, wherein said time delay reset circuit includes:
   a. delay means for delaying current for a predetermined time;
   b. a first conductor connecting said delay means and said contact means;
   c. electromagnetic means for resetting said actuating means; and
   d. a second conductor for connecting said delay means and said electromagnetic means.

7. The apparatus of claim 3, wherein said pendulum means includes:
   a. a support mounted on the existing accelerator linkage;
   b. a pendulum pivotally mounted on said support;
   c. a bracket for limiting the arc of movement of said pendulum; and
   d. a spring assembly for preventing said pendulum from moving when the accelerator linkage is moved in a normal manner.

8. The apparatus of claim 5, wherein said pendulum means includes:
   a. a support mounted on the existing accelerator linkage;
   b. a pendulum pivotally mounted on said support;
   c. a bracket for limiting the arc of movement of said pendulum; and
   d. a spring assembly for preventing said pendulum from moving when the accelerator linkage is moved in a normal manner.

9. The apparatus of claim 8, wherein said time delay reset circuit includes:
   a. delay means for delaying current for a predetermined time;
   b. a first conductor connecting said delay means and said contact means;
   c. electromagnetic means for resetting said actuating means; and
   d. a second conductor for connecting said delay means and said electromagnetic means.